Patented July 28, 1953

2,647,138

UNITED STATES PATENT OFFICE 2,647,138

CATALYST FOR THE HYDROGENATION OF CARBON MONOXIDE

Walter Rottig, Oberhausen-Sterkrade-Nord, Germany, assignor to Ruhrchemie Aktiengesellschaft, Oberhausen-Holten, Germany, a joint-stock company of Germany No Drawing. Application August 8, 1949, Serial No. 109,225. In France August 20, 1948

9 Claims. (Cl. 260—449.6)

This invention relates to catalysts and more especially to contact substances adapted for use in the hydrogenation of carbon monoxide. It is an object of this invention to provide an iron catalyst, capable of furthering the reactions leading to this hydrogenation under normal conditions, i. e. under atmospheric pressure, and which is more effective than other catalysts of this type which were hitherto used in this reaction.

I have found that in order to obtain the highest yield in the catalytic hydrogenation of carbon monoxide, a composition of the iron catalyst must be provided for, which contains metallic iron (Fe), ferrous oxide (FeO) and ferric oxide ($Fe_2O_3$) in certain predetermined proportion.

I have found that the iron catalyst in order to yield a high percentage of hydrogenation products and to enable the hydrogenation of carbon monoxide to be carried through at about atmospheric pressure, should contain, besides the conventional carrier substances and activators, the Fe in the form of approximately 25 to 30 percent metallic iron, 50 to 61 percent ferrous oxide and 25 to 4 percent ferric oxide.

It is necessary that the reduced contact substance should be analysed to ascertain the percentage of Fe, FeO and $Fe_2O_3$ in it. An iron catalyst effective at atmospheric pressure and containing as carrier substance 50 to 200 percent silica per 100 parts iron, should not contain more than approximately 25 to 35 percent Fe. Whenever the percentage of free iron is materially higher or lower, the course of the synthetic reaction is impaired materially.

I have also found that the synthetic aptitude of an iron catalyst according to this invention is greatly influenced by the way in which it is reduced. It is well known that in iron catalysts a preliminary treatment with reducing gases exerts a decisive influence on the activity of the catalyst during the hydrogenation of carbon monoxide under normal or increased pressure. The reduction may be carried through for instance with hydrogen, carbon monoxide or another reducing gas or gas mixture. While cobalt catalysts can be reduced under practically the same conditions for atmospheric and for increased pressure syntheses, the synthetic properties of iron catalysts depend largely on the conditions under which the catalyst mass is reduced.

With the iron catalysts according to this invention, the reduction is preferably carried through at temperatures within the range of 200–240° C. During the reduction the speed of flow of the reduction gases should amount approximately to 1.3–1.5 m./sec., calculated for room temperature.

The length of the reduction period is another important factor. When operating with speeds of flow of the gases such as mentioned above, the reduction should be extended through about 30 to 60 minutes.

The new iron catalysts according to this invention are preferably impregnated with an alkali, for instance with potassium hydroxide or potassium waterglass to an extent which (calculated as $K_2O$) lies between 0.5 and 5 percent $K_2O$ and preferably between 1 and 3 percent $K_2O$. Instead of the alkali compounds mentioned above, acid potassium orthophosphate or other alkali salts of mineral acids which are not volatile at a temperature above normal are also suitable for this impregnation.

I am thus enabled to raise the activity of the catalyst, to lower the formation of methane and to materially raise the formation of paraffine. Impregnations above 5 percent $K_2O$ result in an unduly high formation of paraffine which would render necessary an almost daily extraction of the catalysts. The percentage of $K_2O$ indicated above always relates to the total percentage of iron (Fe) in the catalysts.

The activity of iron catalysts composed and reduced according to this invention, was found to be the highest obtainable in many tests made to ascertain the influence of various reduction methods. Iron catalysts as above described were able to convert 70 to 75 percent of the gas mixture in a process of hydrogenation of carbon monoxide carried through at a temperature of 200 to 220° C. with 100 parts by volume of the original gas mixture acting on 1 part by volume of the catalyst substance per hour. Water gas was used in these tests. Since the iron catalysts did not convert this water gas in the form used in the reaction, but owing to secondary reactions, more especially due to conversion, consumed more carbon monoxide then corresponded to the fundamental synthesis equation, the yield mentioned above of 70 to 75 percent in reality represents a practically complete conversion, i. e. a conversion of about 92 to 97 percent of the carbon monoxide present in the starting gas mixture.

The life of the iron catalysts according to this invention, is extraordinarily long, mounting to at least 10,000 to 12,000 hours of actual operation.

Kieselguhr, alumina, magnesia and similar substances can be used as carrier substances. Copper, calcium oxide, zinc oxide and other metal compounds may for instance serve as activators. It should be noted that the catalysts can also be produced and used without any carrier substances.

In the operation of this invention I may, for instance proceed as follows:

Example 1

By precipitating a suitable metal nitrate solution with a soda solution at a hydrogen ion concentration pH=9.2 under the addition of kieselguhr a catalyst substance was produced which contained 100 parts Fe, 5 parts Cu and 10 parts CaO per 100 parts kieselguhr; after washing out the remaining alkali, the substance was impregnated with a small quantity of KOH and dried at 120° C.

When for 40 minutes hydrogen was passed over this catalyst at 225° C. at a linear speed of 1.35 m./sec., the content of free iron (Fe) amounted to about 30 percent.

In the synthetic process this catalyst was acted upon hourly with 100 parts by volume water gas per one part of the contact. The temperature of the synthetic reaction was 220° C. The reaction of $CO+H_2$ reached 65 to 68 percent which amounted to a consumption of 1 part by volume carbon monoxide to 0.65 part by volume hydrogen. The consumption of CO amounted to more than 90 percent.

When the reduction was carried out at 300° C. (instead of 225° C.) only a conversion of about 45 percent $CO+H_2$ could be obtained.

When the catalyst was reduced at a gas speed of 45 cm./sec. (instead of 1.35 m./sec.) there resulted only a conversion of about 50 percent $CO+H_2$.

Example 2

By precipitating suitable metal nitrate solutions with a soda solution at a hydrogen ion concentration pH=7.3 under the addition of kieselguhr, an iron catalyst was produced which contained per 50 parts kieselguhr 100 parts Fe, 5 parts Cu and 3 parts CaO. The precipitate was washed and then impregnated with 1 percent $K_2O$ in the form of potassium waterglass (calculated for the content of Fe). It was then dried at 115° C.

When reducing this catalyst at 220° C. with hydrogen at a linear speed of flow of the gas of 1.4 m./sec. for 40 minutes, the content of free iron amounted to 33 percent Fe.

When the catalyst was used for the synthesis with water gas at 220° C., 100 parts by volume of the gas being passed hourly over 1 part by volume of the catalyst, a yield of 65 to 70 percent $(CO+H_2)$ was obtained. The proportion of reacted substances was about 0.65 and the conversion of CO amounted to more than 95 percent.

When in the reduction the gas speed of flow was reduced from 1.40 m./sec. to 40 cm./sec. the yield of the synthesis dropped to 50 to 55 percent $(CO+H_2)$.

When the reaction temperature was raised to 300° C., the yield of the subsequent synthetic process amounted to 45 percent $(CO+H_2)$.

Example 3

By adding hot soda solution to a hot solution of suitable metal nitrates in water without adding a carrier substance, a catalyst was precipitated in a hydrogen ion concentration pH=7.1, which contained 5 parts copper per 100 parts iron. After having been thoroughly rinsed, this catalyst was impregnated with acid potassium orthophosphate ($KH_2PO_4$) to the extent that in the finished catalyst 1 part $K_2O$ in the form of acid orthophosphate was present per 100 parts Fe.

The catalyst was dried at 110° C. and then reduced for 60 minutes at 235° C. with a mixture of nitrogen and hydrogen, the gas mixture flowing at a speed of 1.4 m./sec., calculated for room temperature. The finished catalyst contained after this treatment 32 percent free iron.

In the synthetical process this catalyst was treated at 210° C. with 100 liters water gas per liter of contact. The reaction of $CO+H_2$ attained 73 percent, corresponding to a conversion of carbon monoxide of 93.5 percent. The formation of methane amounted to about 8 percent.

When the reduction temperature for the production of the catalyst was raised from 235° to 300° C., the catalyst showed under otherwise equal conditions a somewhat lower yield and the formation of methane increased by about 14 percent.

By lowering the reduction temperature from 235° C. to 200° C., while maintaining a speed of flow of the gas of 1.4 m./sec. the yield dropped from 73 percent to 51 percent. If the speed of flow was lowered to 0.35 m./sec., the yield at the same reduction temperature dropped to about 58 percent.

Various changes may be made in the operation of this process and in the proportions of substances described above without departing from the invention or sacrificing the advantages thereof.

I claim:

1. A precipitated alkali-promoted iron type catalyst containing metallic iron (Fe) within the range of about 25–35 percent, ferrous oxide (FeO) within the range of about 50–61 percent and ferric oxide ($Fe_2O_3$) within the range of 25–4 percent.

2. The catalyst of claim 1, containing also a carrier substance.

3. The catalyst of claim 1, containing also an alkali salt of a mineral acid non-volatile at temperatures above normal, in a quantity equivalent to 0.5 to 5% calculated as $K_2O$ and as a percentage of the entire iron content.

4. The method of producing the catalyst of claim 1 which comprises precipitating an iron salt solution with an alkali, washing the precipitate for the removal of any residual alkali and passing over the dried precipitate for 30–60 minutes a reducing gas at a temperature between 200 and 300° C. and at a speed of flow of the gas of 1.3–1.4 m./sec.

5. The method of claim 4, in which the temperature of treatment ranges between 200° and 240° C.

6. The method of claim 4, in combination with the step of impregnating the product of reduction with 0.5–5% of an alkali calculated as $K_2O$ and as a percentage of the entire iron content.

7. The method of claim 4, in combination with the step of impregnating the product of reduction with 0.5–5% of an alkali of a mineral acid which is not volatile at a temperature above normal, calculated at $K_2O$ and as a percentage of the entire iron content.

8. The catalyst of claim 1, containing also 0.5–5 percent of an acid alkali metal orthophosphate, calculated as $K_2O$ and as a percentage of the entire Fe-content.

9. The process of hydrogenating carbon monoxide mixed with hydrogen which comprises passing said mixture at a temperature ranging between about 200° and 300° C. under a pressure near atmospheric pressure across a precipitated alkali-promoted catalyst which has been reduced with reducing gas and containing metallic iron within the range of 25 and 35%, ferrous oxide within the range of about 50 and 61%, ferric oxide within the range of about 4 and 25% and an acid alkali metal orthophosphate within the range of about 0.5 and 5%, the velocity of flow of the reducing gas for the reduction of the catalyst being between about 1.3 and 1.4 meters per second, the reduction period between about 30 and 60 minutes and the reduction temperature between about 200 and 240° C.

WALTER ROTTIG.

References Cited in the file of this patent

UNITED STATES PATENTS

| Number | Name | Date |
|---|---|---|
| 2,257,457 | Fischer et al. | Sept. 30, 1941 |
| 2,414,585 | Eggertsen et al. | Jan. 21, 1947 |
| 2,460,508 | Johnson et al. | Feb. 1, 1949 |
| 2,461,570 | Roberts | Feb. 15, 1949 |
| 2,485,945 | Walker | Oct. 25, 1949 |

OTHER REFERENCES

U. S. Naval Technical Mission In Europe, Technical Report No. 248—45, pages 41 (42F), 42 (43F), to 48 (49F), 54 (55F), 59 (60F), and 60 (61F), August 2, 1946.